US011925939B2

(12) United States Patent
Meier et al.

(10) Patent No.: US 11,925,939 B2
(45) Date of Patent: Mar. 12, 2024

(54) IMPACT CRUSHER

(71) Applicant: Kleemann GmbH, Göppingen (DE)

(72) Inventors: Jochen Meier, Hülben (DE); Christian Schlecht, Aalen (DE)

(73) Assignee: Kleemann GmbH (DE)

(*) Notice: Subject to any disclaimer, the term of this patent is extended or adjusted under 35 U.S.C. 154(b) by 148 days.

(21) Appl. No.: 17/478,454

(22) Filed: Sep. 17, 2021

(65) Prior Publication Data

US 2022/0097076 A1 Mar. 31, 2022

(30) Foreign Application Priority Data

Sep. 25, 2020 (DE) ..................... 10 2020 125 132.7

(51) Int. Cl.
*B02C 25/00* (2006.01)
*B02C 13/06* (2006.01)

(52) U.S. Cl.
CPC .............. *B02C 25/00* (2013.01); *B02C 13/06* (2013.01); *B02C 2210/01* (2013.01)

(58) Field of Classification Search
CPC ....... B02C 25/00; B02C 13/06; B02C 13/095; B02C 2210/01
See application file for complete search history.

(56) References Cited

U.S. PATENT DOCUMENTS 4,084,752 A 4/1978 Hagiwara et al.
5,226,604 A 7/1993 Seiffert et al.
6,454,195 B1 * 9/2002 Amano .................. B02C 18/18 144/241
10,279,354 B2 5/2019 Young et al.
2003/0038196 A1 2/2003 Moriya et al.
2011/0253822 A1 * 10/2011 Dallimore ............ B02C 13/095 241/189.1

(Continued)

FOREIGN PATENT DOCUMENTS

DE 2655655 A1 6/1977
DE 102010015583 B4 * 7/2018 ............ B02C 13/06

(Continued)

OTHER PUBLICATIONS

European Patent Office Examination for corresponding patent application No. 21194266.9, dated Mar. 23, 2022, 8 pages (not prior art).

(Continued)

*Primary Examiner* — Faye Francis
(74) *Attorney, Agent, or Firm* — Lucian Wayne Beavers; Patterson Intellectual Property Law, PC

(57) ABSTRACT

A method of determining wear of a rotary impact crusher includes adjusting the position of an impact rocker relative to an impact rotor with an actuator by a first adjustment value until a crushing section of the impact rocker contacts an impact bar or an impact circle of the impact rotor. The first adjustment value is compared to a first reference value to make a first comparison corresponding to total wear of the impact rocker and the impact bar. The position of the impact rocker is adjusted relative to the impact rotor by a second adjustment value until the impact rocker contacts a reference measurement section. The second adjustment value is compared to a second reference value to make a comparison corresponding to wear of the impact rocker.

18 Claims, 4 Drawing Sheets

(56) References Cited

U.S. PATENT DOCUMENTS

| | | | | |
|---|---|---|---|---|
| 2013/0284839 | A1* | 10/2013 | Faure | B02C 13/26 241/189.1 |
| 2015/0209797 | A1* | 7/2015 | Salonen | B02C 13/09 241/189.1 |
| 2016/0114331 | A1* | 4/2016 | Young | B02C 13/09 241/189.1 |
| 2021/0239144 | A1 | 8/2021 | Gnam et al. | |

FOREIGN PATENT DOCUMENTS

| | | | | |
|---|---|---|---|---|
| DE | 102017124961 | * | 9/2018 | B02C 13/30 |
| DE | 102017124961 | B3 | 9/2018 | |
| EP | 391096 | A2 | 10/1990 | |
| EP | 1287893 | A2 | 3/2003 | |
| JP | 2002346410 | A | 12/2002 | |
| WO | WO-2004004908 | A1 * | 1/2004 | B02C 1/025 |
| WO | WO-2012104521 | A1 * | 8/2012 | B02C 13/095 |

OTHER PUBLICATIONS

German Office Action for corresponding patent application No. DE 10 2020 125 132.7, dated Jul. 20, 2021, 12 pages (not prior art).

* cited by examiner

IMPACT CRUSHER

RELATED APPLICATIONS

The present application claims priority to German Application No. DE 10 2020 125 132.7 filed Sep. 25, 2020, the details of which are incorporated herein by reference.

BACKGROUND OF THE INVENTION

The invention relates to an impact crusher, in particular a rotary impact crusher having a crusher unit, which has an impact rotor, wherein the impact rotor bears at least two impact bars, wherein the impact bars have a radially outer end, wherein the radially outer end of at least one of the impact bars forms an impact circle, wherein at least one impact rocker is assigned to the impact rotor such that, in an operating position, a crushing gap is formed between the impact circle and a crushing section of the impact rocker, wherein, for setting the crushing gap, first the crushing section of the impact rocker is adjusted by means of an actuating unit in a feed direction by a first adjustment value such that it contacts a contact point of the impact bar, in particular the radially outer end and/or the impact circle, wherein the first adjustment value is compared to a first reference value in a controller, and wherein the crushing section is adjusted by a predetermined gap dimension to create the crushing gap.

DESCRIPTION OF THE PRIOR ART

From EP 0 391 096 B2 (U.S. Pat. No. 5,226,604) a rotary impact crusher is known, which has a rotor rotatable about an axis in a housing. The rotor bears impact bars, which have one free end each on the outer periphery of the rotor. These radially outer ends of the impact bar form an impact circle. An impact rocker of a crusher is arranged opposite from the rotor. A crushing gap is formed between a crushing section of the impact rocker and the impact circle. An actuating unit can be used to adjust the impact rocker such that the width of the crushing gap can be varied. To set a predetermined width of the crushing gap to a predetermined dimension, the actuating unit first closes the impact rocker in the direction of the impact circle while the rotor is running. As soon as the impact rocker contacts the impact circle and thus the outer ends of the impact bar, a mechanical noise is generated. It can be recorded using a microphone. In this way, the so-called zero position of the impact rocker is determined. Starting from this zero position, the actuating unit is then used to retract the impact rocker. The travel is monitored. The desired crushing gap can be set in this way.

U.S. Pat. No. 10,279,354 B2 discloses a rotary impact crusher having a rotor which also has projecting free ends of impact bars on its outer periphery. In this way, an impact circle is also formed. Two impact rockers are assigned to the rotor. At least one of the impact rockers in this rotary impact crusher can be moved from its home position to the zero position. A distance meter can be used to determine the adjustment value until the zero position is reached. This adjustment value is compared to an adjustment value that results when the rotary impact crusher has non-worn impact bars and a non-worn impact rocker. In this way, the total wear caused by wear of the impact bars and the impact rocker can be determined.

Such a rotary impact crusher is known from DE 26 55 655 C2 (U.S. Pat. No. 4,084,752), for instance. A measurement device that can be used to determine the total wear of the impact bar and of the impact rocker is also described there.

SUMMARY OF THE INVENTION

The invention addresses the problem of creating an impact crusher of the type mentioned above, in which the wear of both the impact rocker and the impact bar can be determined in a simple manner.

This problem is solved by bringing the crushing section into contact with a reference measurement section in an additional measurement step and in doing so, determining a second adjustment value, wherein this second adjustment value is compared to a second reference value.

Similar to the prior art, the total wear in the system can first be determined by moving the impact rocker from a home position to the zero position. In this zero position, the impact rocker is in contact with the free end of the impact bar or the impact circle. This can be done while the rotor is running. The contacting of the impact bar can be recognized by a mechanical noise. This mechanical noise can either be detected by means of a signal transducer or it can be detected acoustically by an operator. A distance meter can be used to detect the first adjustment value, which results when the impact rocker is moved from its predefined home position, which adjustment value can be fed into a measurement unit comprising a computing unit. Alternatively, it is also conceivable that this measurement is performed with a stationary impact rotor. The impact rocker, for instance, is then moved until it contacts the radially outer end of the impact bar. Alternatively, it is also conceivable to drive the crushing section of the impact rocker against a predetermined contact point of the impact bar in an operating state in which the impact rotor is stationary. This contact point is preferably located at a position of the impact bar which has a wear comparable to that of the radial end of the impact bar. For instance, a free surface of the impact bar adjacent to the radial end is suitable as a contact point. The first adjustment value provides information on the total wear, which is computed by adding the wear of the free end of the impact bar and of that of the crushing section. For this purpose, for instance, the previously set width of the crushing gap, which forms the first reference value, can be subtracted from the first adjustment value. The result reflects the total wear.

The second adjustment value can be determined after (or before) the first adjustment value has been determined. For this purpose, a relative motion between the impact rocker and a reference measurement section of the impact rotor is performed from a home position. Preferably, this motion is the result of an adjustment of the impact rocker from a home position towards the impact rotor until the crushing section comes into contact with the reference measurement section of the impact rotor. The reference measurement section is located at a point on the impact rotor that is subject to little or no wear. Preferably, this reference measurement section is located in the circumferential area of the impact rotor between two adjacent impact bars. The second adjustment value provides information on the wear of the impact rocker. For instance, this second adjustment value can be compared to a second reference value in the computing unit of the measurement unit, which second reference value results when the impact rocker is moved from the basic position relative to the reference measurement section in the non-worn state. The wear of the impact rocker is computed by subtracting the second reference value from the second adjustment value. Subsequently, the computing unit can determine the wear of the impact bar by computing the difference between the total wear minus the wear of the impact rocker.

In this way, the wear of the impact bar or impact bars and the wear of the impact rocker can be recorded separately and individually using simple means. In particular, the use of complex optics is not required and there is no need for an operator to enter the crushing chamber with measurement equipment.

According to a preferred embodiment of the invention, provision can be made that the reference measurement section is formed at the impact rotor. In this way, a simple design results. In particular, the reference measurement section can be arranged on the impact rotor in such a way that it is located in the range of motion defined by the swivel bearing of the impact rocker.

In particular, provision can be made that the impact rotor is rotated to a position in which the reference measurement section faces the crushing section of the impact rocker, that the rotary motion of the impact rotor is then stopped or slowed down, and that subsequently the crushing section is moved until it rests against the reference measurement section. Preferably, the crushing section is adjusted by swiveling the entire impact rocker about its swivel bearing. Preferably, provision can be made that the adjustment motion of the impact rocker is effected by an actuating unit which is used to support the impact rocker when the crushing gap is adjusted, and wherein this adjustment unit is used to adjust the width of the crushing gap.

One embodiment of an impact crusher according to the invention can be such that a sensor, in particular a force gauge, is used, which determines the contact of the crushing section with the reference measurement section, and that a switching unit is used to stop the actuating motion of the crushing section in the direction of the reference measurement section or the actuating motion of the reference measurement section in the direction of the crushing section when the sensor emits a contact signal. The sensor may be integrated in the actuating unit, which is used to support the impact rocker when the crushing gap is set. For instance, the sensor may include a strain gauge, or the sensor may detect when the actuating unit stops moving as a result of contact between the crushing section and the reference measurement section. For instance, the sensor can then be designed as a displacement sensor According to the invention, provision can be made that in the contact position, in which the crushing section contacts the reference measurement section, the travel as the second adjustment value of the impact rocker or of a part of the impact rocker is determined directly or indirectly by means of the controller, in particular the deflection of the impact rocker, and is compared to the second reference value. In this procedure, the position of the impact rocker is assessed when contact with the reference measurement section is made. For instance, the angular position of the impact rocker, which results from a rotation of the impact rocker around its swivel bearing, can be assessed in doing so. This angular deflection can be compared to a second reference value obtained by rotating an impact rocker in the non-worn condition.

Alternatively, it is also conceivable that the impact rocker is moved from a predetermined reference position until the crushing section is in contact with the reference measurement section and that the degree of displacement is directly or indirectly determined as a second value by the controller and compared to the second reference value. In this procedure, the resulting travel of the impact rocker is assessed. The reference positions of the impact rocker can be formed from any predetermined and previously defined position of the impact rocker.

In one conceivable variant of the invention an actuator is provided, which is used to rotate the impact rotor to a predetermined angular position and stopped there, wherein the crushing section faces the reference measurement section. The actuator may be formed by the main impact crusher drive, which drives the impact rotor. Furthermore, it is conceivable that the impact rotor can be driven by means of an auxiliary drive to move it into the desired position. The auxiliary drive can in particular be formed by a separate motor unit which, in addition to the main drive, acts on the impact rotor. Further preferably, alternatively provision made be made for the auxiliary drive to be formed by a manually operated actuator. For instance, such an actuator can be used by the operator to manually rotate the impact rotor to the desired position.

A significantly simplified data logging results if provision is made to form one or more surface areas of the impact rotor to be used as a reference measurement section and that the impact rotor is adjusted such that one of the reference measurement sections faces the crushing section. Then, the crushing section of the impact rocker can be quickly assigned to the closest reference measurement section for detecting the second actuating value. It is particularly easy to perform data logging if provision is made for one or more of the reference measurement sections to have the shape of a circular segment rotating about the axis of rotation of the impact rotor in side view perpendicular to the axis of rotation of the impact rotor. The reference measurement sections can then be spaced equi-distant from the axis of rotation of the impact rotor. It is therefore not absolutely necessary to take the angular position of the impact rotor into account when the crushing section is in contact with the desired reference measurement section.

Provision can also be made that the position of the impact rotor, in particular the angular position of the impact rotor, is detected and transmitted to the controller. There, provision can be made in particular that several reference measurement sections merge into one another, preferably continuously. The individual reference measurement sections can be stored correlated to the position, in particular the angular position, of the impact rotor, in the controller. The crushing section of the impact rocker then only has to be applied to one, preferably the nearest, reference measurement section. The controller then detects the orientation, in particular the angular position of the impact rotor, and the controller is then used to assign this detected orientation to the position of the reference measurement section. This position of the reference measurement section can then be included in the determination of the second adjustment value.

According to a conceivable variant of the invention, provision can be made that one or more of the reference measurement sections, in side view perpendicular to the axis of rotation of the impact rotor, form a cross-sectional shape that changes in the circumferential direction of the impact rotor, in particular the shape of a spiral arc segment rotating about the axis of rotation of the impact rotor, and that the radial distance of at least part of the surface areas of the reference measurement sections from the axis of rotation of the impact rotor are stored in a memory unit of the controller.

If provision is made that several measurements are performed, preferably at constant time intervals, in which the first and the second adjustment values are determined, and that the controller in a computing unit determines the expected remaining service life of the impact bar and/or of the impact rocker from the actuating values determined, then a wear forecast can be performed in a simple manner. In particular, it can then be determined whether the impact rocker and/or the impact bar have sufficient remaining service life for an upcoming machining task.

A further refinement of the wear prediction can be made if provision is made that a material property of the material to be crushed is fed to the computing unit, and that the computing unit determines the remaining service life of the impact bar and/or the impact rocker, taking into account the material property. The material property can be determined, for instance, by sampling and evaluating, for instance, by determining the hardness or abrasiveness of the material to be crushed. Similarly, a material property, such as hardness or abrasiveness, can be determined from the determined wear.

BRIEF DESCRIPTION OF THE DRAWINGS

The invention is explained in greater detail below based on an exemplary embodiment shown in the drawings. In the Figures.

DETAILED DESCRIPTION

Figure 1:
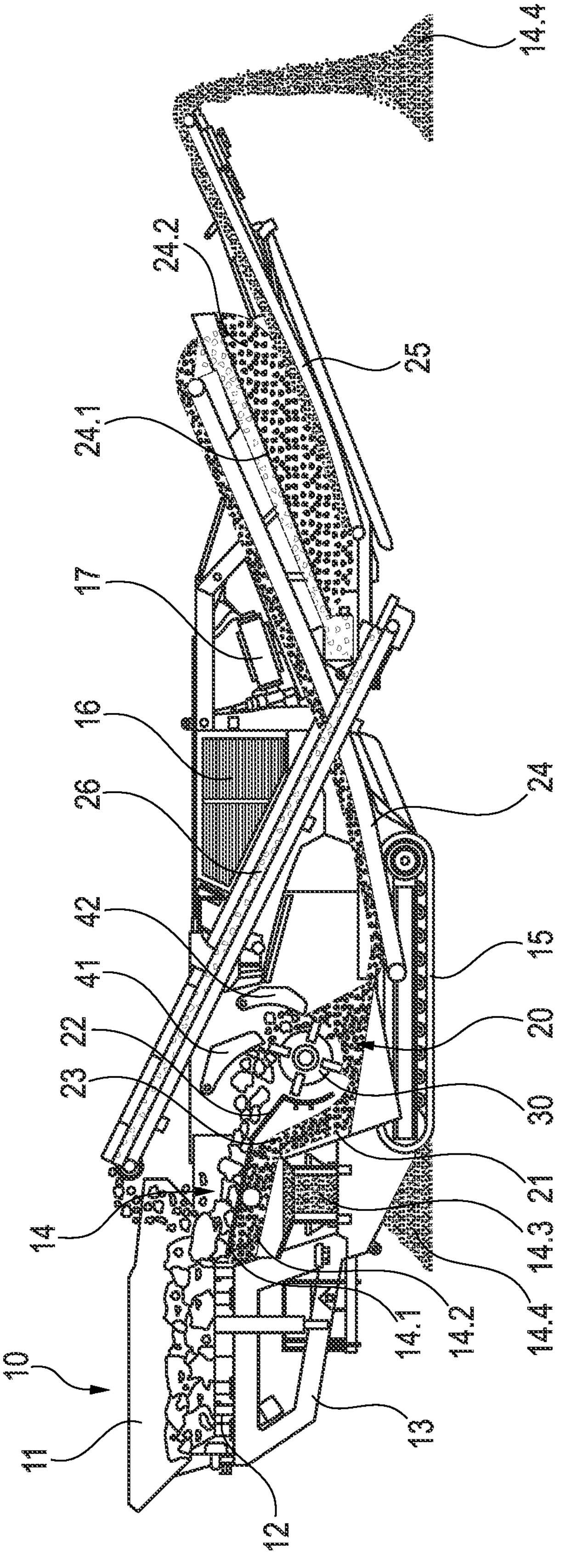
FIG. 1 shows a side view of a schematic representation of an impact crusher partially in section.

FIG. 1 shows a lateral, partially cutaway view of an impact crusher designed as a rotary impact crusher. The impact crusher can be designed as a mobile unit with a chassis 13 and a chain drive 15. It has a feed unit 10, if necessary a pre-screen unit, a crusher unit 20 and at least one crusher discharge conveyor 24.

A hopper 11 can be arranged in the area of the feed unit 10. The hopper 11 has hopper walls. It directs the fed feed material to a conveyor unit 12, which can preferably be designed as a vibratory feed chute.

The conveyor unit 12 conveys the feed material to a screening unit 14, which may be formed by a double-deck prescreen, for instance. In this exemplary embodiment, the screen unit 14 has an upper heavy-duty double-deck screen 14.1, which is designed as a comparatively coarse screen and forms an upper deck. Below, there is a comparatively finer screen forming a lower deck 14.2. A drive causes it to vibrate in a circular motion. The upper deck separates a fine fraction and a medium grain from the material to be crushed. The lower deck separates the fine fraction from the medium grain. The fine fraction can optionally be discharged from the material crusher plant by means of a side discharge belt 14.3 or returned to the medium grain by setting a bypass flap accordingly. The medium grain is routed past the crusher unit 20 to the crusher discharge conveyor 24 via a bypass 23. The material to be crushed is routed to the crusher unit 20 via a crusher inlet 22 at the end of the pre-screen unit.

The crusher unit 20 has a crusher housing 21, in which an impact rotor 30 is rotatably mounted. A main drive 16 of the impact crusher can be used to drive the impact rotor 30. The impact rotor 30 rotates about an axis of rotation 32.

Figure 2:
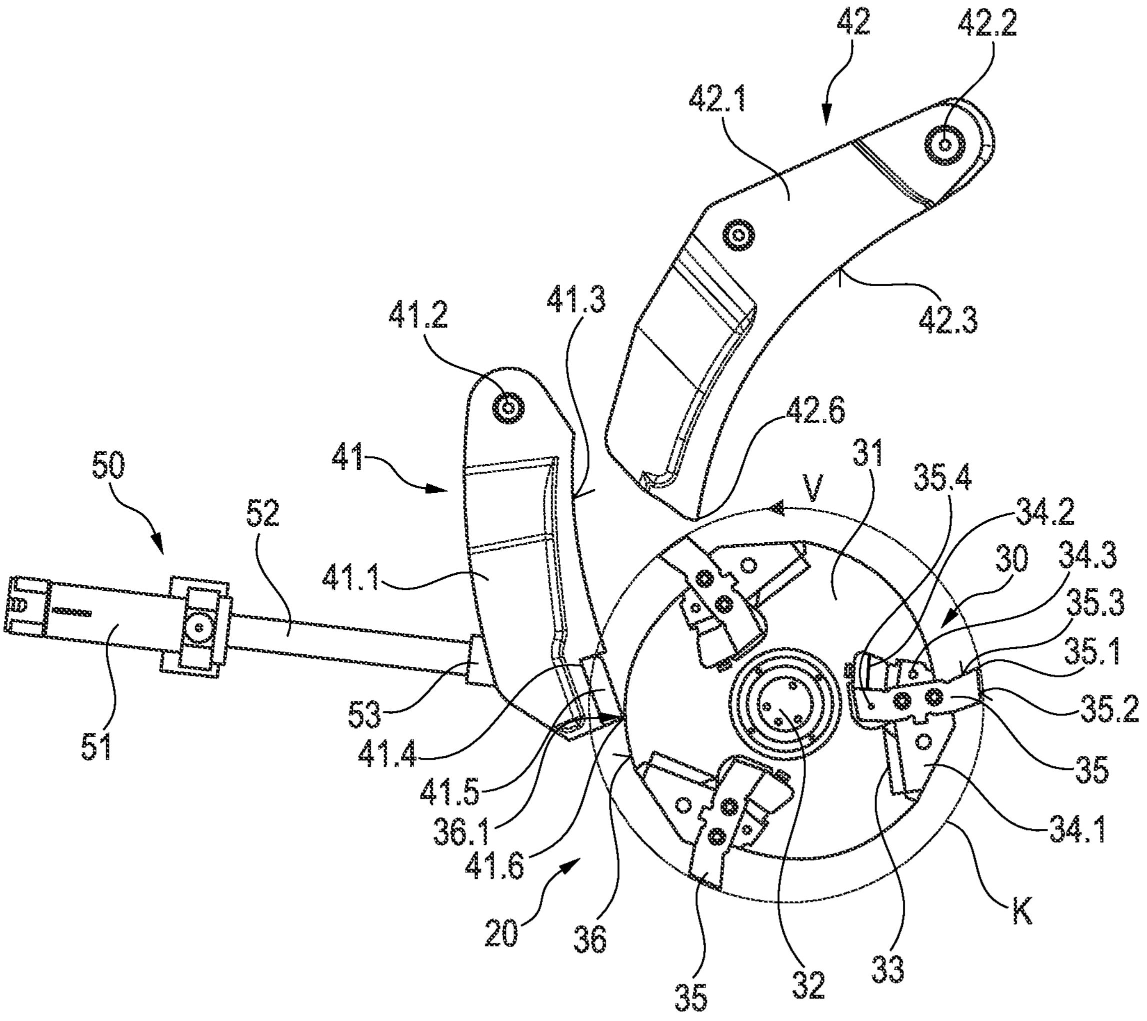
FIG. 2 shows a side view of a detailed representation of a crusher unit of the impact crusher according to FIG. 1
Figure 3:
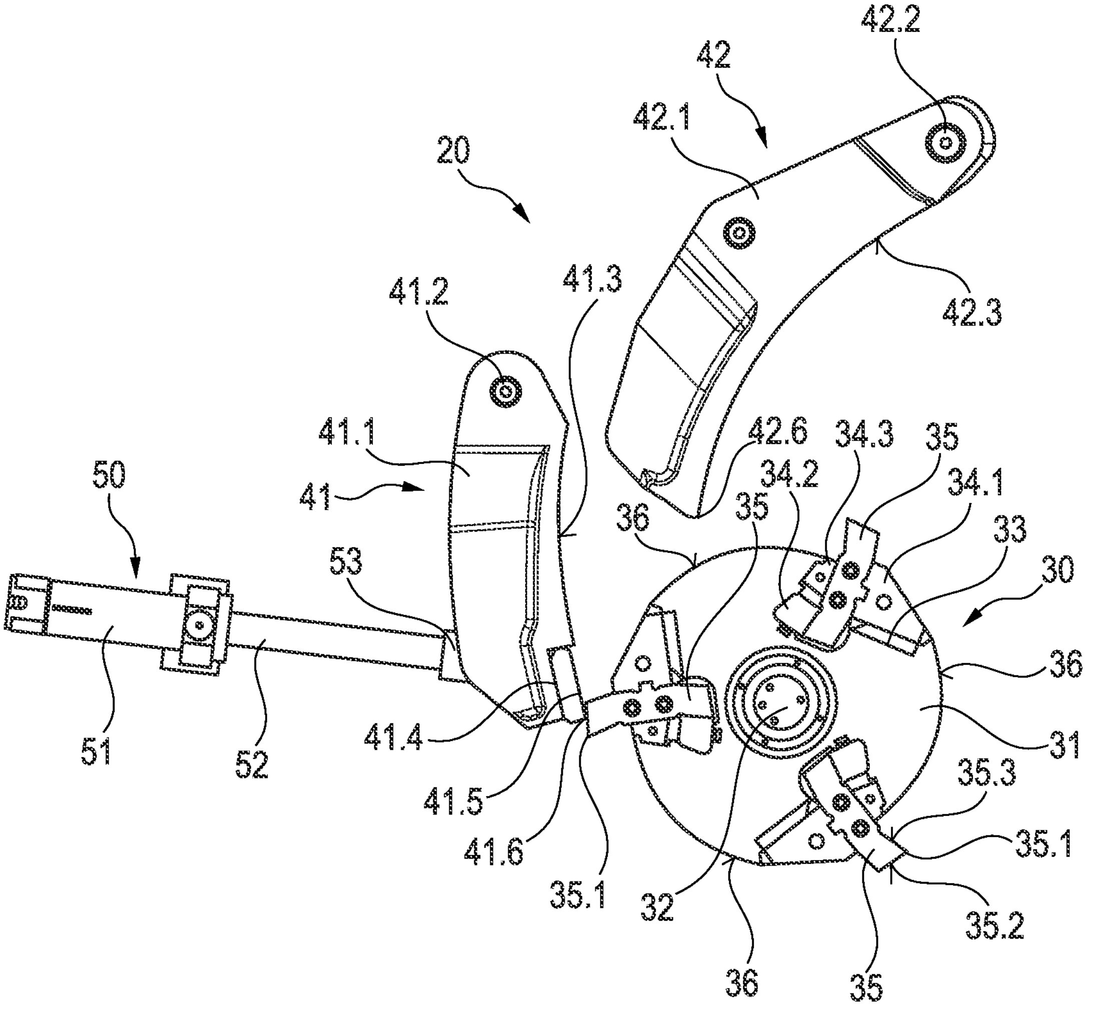
FIG. 3 shows the representation of FIG. 2 in a different operating position.

FIGS. 2 and 3 show the structure of the crusher unit 20 more clearly. As these drawings illustrate, the impact rotor 30 has a carrier 31 having several mounts 33 on its outer periphery. In this exemplary embodiment, three mounts 33 are provided. However, it is also conceivable that only two or more than three mounts 33 are used.

Impact bars 35 can be interchangeably inserted into the mounts 33 and a securing section 35.4 can be used to interchangeably secure impact bars in the mounts 33.

For instance, it is conceivable that a bearing piece 34.1 is inserted in the mount 33 in the direction of rotation V at the rear, preferably interchangeably, for securing the impact bars 35. The rear end of the impact bar 35 can be supported against this bearing piece 34.1. Preferably, provision is made that at least one clamping wedge 34.2, 34.3 is installed in front of the impact bar 35 in the direction of rotation V of the impact rotor 30. In this exemplary embodiment, two clamping wedges 34.2, 34.3 are provided for the stable securing of the impact bar 35. Tensioners can be used to adjust the clamping wedges 34.2, 34.3 to press the impact bar 35 against the rear bearing piece 34.1.

The impact bars 35 have one radial end 35.1 each. In this exemplary embodiment, the radially outer ends 35.1 of the impact bars 35 are located on a joint impact circle K.

Free areas 35.2 adjoin the radial ends 35.1 of the impact bars 35. The open spaces 35.2 extend at a distance from the impact circle K.

Adjacent to the radial ends 35.1, the impact bars 35 have front surfaces 35.3 at the front. These front surfaces 35.3 protrude beyond a circumferential rotor surface 36.

The rotor circumferential surface 36 forms reference measurement sections 36.1 between the mounts 33 and thus between the impact bars 35. As FIG. 2 shows, the reference measurement sections 36.1 are formed by arc segments that extend spirally around the axis of rotation 32 of the impact rotor 30. Accordingly, the distance of the circumferential rotor surface 36 from the axis of rotation 32 increases continuously, at least piecewise. In this exemplary embodiment, this distance increases continuously in the circumferential direction. However, it is also conceivable that the distance increases in the direction counter to the circumferential direction.

Preferably, a reference measurement section 36.1 is arranged in each intermediate area between the impact bars 35. However, it is also conceivable that only one reference measurement section 36.1 is provided on the circumferential rotor surface 36.

The crusher unit 20 has two impact rockers 41, 42. These impact rockers 41, 42 are assigned to the impact rotor 30.

The impact rocker 42 has a rocker body 42.1 that is connected in a swiveling manner to the chassis 13 via a swivel bearing 42.2. The oscillating body 42.1 has an impact surface 42.3 at the front, which is assigned to the impact rotor 30. At its end facing away from the swivel bearing 42.2, the impact surface 42.3 ends in a crushing section 42.6.

An actuating unit, which is not shown in FIG. 2, is used to swivel the impact rocker 42 about the swivel bearing 42.2.

The impact rocker 41 has a rocker body 41.1 that is connected in a swiveling manner to the chassis 13 via a swivel bearing 41.2. The oscillating body 41.1 has an impact surface 41.3 at the front, which is assigned to the impact rotor 30. The impact surface 41.3 has a mount 41.4 at its end facing away from the swivel bearing 41.2. A wear insert 41.5 is secured in this mount 41.4, preferably in an interchangeable manner. The wear insert 41.5 is made of a material which has a greater hardness than the impact surface 41.3. Preferably, the wear insert 41.5 is made of a hard material. The wear insert 41.5 has a crushing section 41.6 at its end facing away from the swivel bearing 41.2.

An actuating unit 50 is used to swivel the impact rocker 41 around the swivel bearing 41.2. The actuating unit 50 can also be referred to as an actuator 50 and may be formed by a hydraulic cylinder. The hydraulic cylinder has a cylinder 51, in which a piston is adjustably guided. A piston rod 52 is connected to the cylinder 51. The end of the piston rod 52 bears a coupling piece 53. The coupling piece 53 is swivel coupled to the oscillating body 41.1. The hydraulic cylinder may be a "smart" cylinder having an integral extension sensor 102 configured to generate an extension signal which is transmitted to the controller 100 shown in FIG. 4 and further described below.

The actuating unit 50 is used to form a resistance against which the impact rocker 41 is arranged to be able to freely oscillate in the crushing chamber to a limited extent.

The actuating unit 50 is further used to adjust the spacing of the crushing section 41.6 and the impact circle K. For this purpose, the piston is moved in the hydraulic cylinder, wherein the piston rod 52 increasingly moves into or out of the cylinder 51 depending on the direction of motion of the piston.

As mentioned above, the material to be crushed is routed to the impact rotor 30 during operation. The impact rotor 30 rotates at a high speed about the axis of rotation 32. In so doing, the front surfaces 35.3 of the impact bars 35 come into engagement with the material to be crushed and accelerate it. The material to be crushed is hurled against the impact surfaces 42.3 and 41.3 of the impact rockers 42 and 41. In so doing, the material to be crushed is broken. If it has a grain size that permits the material to fall between the crushing section 42.6 and the impact circle K, the crushed material is further crushed at the impact rocker 41. When a grain size is reached that permits the crushed material to fall through the crushing gap formed between the crushing section 41.6 and the impact circle K, the crushed material passes onto the crusher discharge conveyor 24.

During operation, both the impact rocker 41 and the impact bars 35 are subject to a high degree of wear. In this way, the size of the crushing gap is increased. If the crushing gap has an impermissible width, it has to be readjusted. The actuating unit 50 is used for this purpose.

According to the invention, the wear of the impact bars 35 and, separately, the wear of the impact rocker 41 can be determined. The material feed is stopped to determine wear and to perform a measurement process. The impact rotor 30 continues to operate until there is no more crushed material in the crusher unit 20. Now the impact rotor 30 runs freely without being influenced by crushed material. The impact rotor 30 is then stopped. The impact rotor 30 is then rotated until the crushing section 41.6 of the impact rocker 41 faces a reference measurement section 36.1 of the impact rotor 30.

Figure 4:
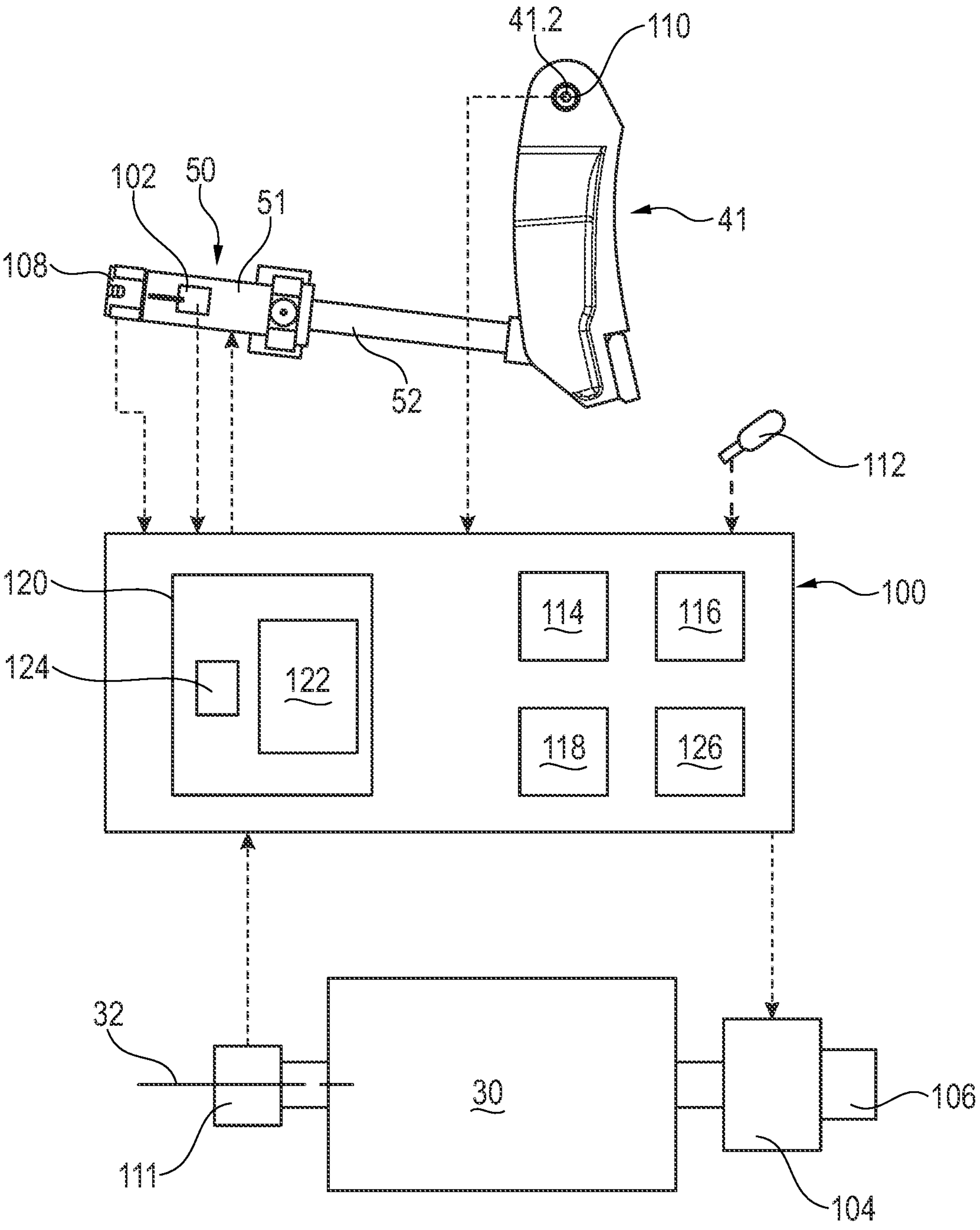
FIG. 4 is a schematic illustration of a controller of the impact crusher and the associated sensors and actuators.

Rotation of the impact rotor 30 can be achieved, for instance, using an auxiliary drive 104 which may be either a manually driven auxiliary drive or an auxiliary drive driven by an electric motor 106 as schematically shown in FIG. 4.

When one of the reference measurement sections 36.1 faces the crushing section 41.6, the actuating unit 50 moves the impact rocker 41, starting from a defined home position, in the direction of the reference measurement section 36.1 until the crushing section 41.6 rests against the reference measurement section 36.1 (see FIG. 2). A force gauge 108 schematically shown in FIG. 4, for instance in the hydraulic cylinder or using another suitable sensor 108, can be used to determine the contact with the reference measurement section 36.1. The deflection of the impact rocker 41 from the home position is measured as the second adjustment value. It can, for instance, be determined by measuring the angle at the swivel bearing 41.2 of the impact rocker 41 with an angular position sensor 110 as schematically shown in FIG. 4 or based on the travel motion of the hydraulic cylinder (for instance, the piston rod 52 or the piston) as detected by the internal extension sensor 102 of the actuator 50. The reference measurement sections 36.1 are arranged between the impact bars 35 in an area which is not subject to wear or at most only to slight wear.

The distance of the circumferential rotor surface 36 from the axis of rotation 32 in the area of the reference measurement sections 36.1 can be stored in a memory unit 116 of the controller 100 of the impact crusher as a functional relationship depending on the angular location on the impact rotor 30 relative to a reference location on the rotor. The reference location on the impact rotor 30 can be any identifiable feature on the impact rotor 30 the angular position of which relative to the impact rocker 41 can be input to the controller 100. It is also conceivable that pairs of values are stored in the memory unit 116 of the controller 100, wherein certain angular locations on the impact rotor 30 are assigned to distances of the circumferential rotor surface 36 from the axis of rotation 32. The movement of the angular locations on the impact rotor 30 about its axis of rotation 32 relative to the impact rocker 41 can be detected by an angular position sensor 111 such as schematically shown in FIG. 4 and the controller 100 can keep track of the angular position of those angular locations relative to the impact rocker 41.

The second adjustment value is compared to a second reference value in a computing unit 114 of the controller. The computing unit 114 may also be referred to as a processor 114. The matching deflection of a non-worn impact rocker 41 in contact with the same area of the reference measurement section 36.1 against which the crushing section 41.6 rests is used as the second reference value. Here, too, a functional relationship or value pairs for the second reference value can be stored in the memory unit 116 of the controller.

The wear of the impact rocker 41 in the area of the crushing section 41.6 can be determined by subtraction, wherein the second reference value is subtracted from the second adjustment value.

It is also conceivable that only an average value of the spacing of the rotor circumferential surface 36 in the area of the reference measurement section 36.1 is stored in the memory unit of the controller as the second reference value. Furthermore, it is conceivable that the circumferential rotor surface 36 as the reference measurement section 36.1 forms an arc of a circle or approximately an arc of a circle that revolves at a radius around the axis of rotation 32. In this case, for instance, the radius of the arc can be used as the second reference value.

The actuating unit 50 then returns the impact rocker 41 to a home position. Then the impact rotor 30 can be rotated, for instance by means of the main drive 16 or by means of an auxiliary drive.

While the impact rotor 30 is rotating, the actuating unit 50 adjusts the impact rocker 41 from a predefined home position until the crushing section 41.6 touches the impact circle K. While the impact rotor 30 is rotating, contact is then made between the impact rocker 41 and the radial end 35.1 of the impact bar 35, which can be determined acoustically, for instance using a microphone 112 as schematically shown in FIG. 4 or by an operator.

In the context of the invention, the contact of the impact rocker 41 with the radial end 35.1 of the impact bar 35 can be determined acoustically with a microphone, as mentioned above. In addition or alternatively, this contact can also be determined using a suitable signal transducer, for instance a contact sensor, in particular an acceleration sensor.

The deflection of the impact rocker 41 from the home position to contact the impact circle K is determined as the first adjustment value. This first adjustment value can be determined, for example, by angular measurement at the pivot bearing 41.2 of the impact rocker 41 with angular position sensor 110 or as a deflection of the hydraulic cylinder (for example, travel of the piston rod 52 or of the piston of the hydraulic cylinder) measured with extension sensor 102. In other words, the "zero position" of the impact rocker 41 is set and determined.

The first adjustment value can also be determined alternatively when the impact rotor 30 is stationary. In this case, the crushing section 41.6 is moved against the radial end 35.1 of the impact bar 35, as shown in FIG. 3. The measured deflection from the predefined home position of the impact rocker 41 is then used as the first adjustment value. The assignment of the impact rotor 30 to the crushing section 41.6 can again be achieved by a manual or motorized auxiliary drive.

The first adjustment value is compared to a first reference value. The first reference value is the matching deflection of a non-worn impact rocker 41 and a non-worn impact bar 35 when the crushing section 41.6 contacts the impact circle K or a contact point of the impact bar 35.

By computing the difference, wherein the first reference value is subtracted from the first adjustment value, the total wear can be determined, which results from the wear of the crushing section 41.6 and the wear of the impact bar 35.

If the total wear and the wear of the impact rocker 41 are now known, the wear of the impact bar 35 can be determined by computing the difference.

In this way, the wear of the impact bar 35 and, separately, the wear of the impact rocker 41 can be easily determined individually, without the operator having to enter the crushing chamber with measurement equipment and/or without having to use complex optical measurement devices.

In the example described above, first the second adjustment value and then the first adjustment value were determined. Of course, the first adjustment value and then the second adjustment value can also be determined in reverse order.

After the measurement process has been completed, the actuating unit 50 can be used to swivel the impact rocker 41 again until the desired width of the crushing gap is set. For instance, from the "zero" crushing gap position, the impact rocker 41 can be moved back to the desired distance dimension in the crushing gap, as is common in the prior art.

With the knowledge of the wear of the impact rocker 41 and the impact bars 35, a wear prediction can be made. For instance, a determination can be made whether the condition of the impact rocker 41 and/or the impact bars 35 is sufficient for a planned material processing job.

For continuous wear prediction, provision may be made in the context of the invention that every time the crushing gap is adjusted or at regular intervals (for instance, once per shift, always at the beginning or end of work, etc.), the operation described above is also performed to determine the wear on the impact rocker 41 and the impact bars 35. In this way, wear can be monitored and a forecast can be used to compute when the impact bars 35 or the wear inserts 41.5 have to be replaced.

As FIG. 1 further shows, the crushed material received from the impact rotor 30 enters the crusher discharge conveyor 24 in conjunction with the material guided in the bypass 23. A magnetic separator 17 can be located above the crusher discharge conveyor 24. This magnetic separator 24 singles out any ferrous particles that may be present in the crushed material. Accordingly, it attracts these iron parts and conveys them laterally out of the transport area of the crusher discharge conveyor 24.

At the end of the crusher discharge conveyor 24, for instance, another screen unit 24.1 having a screen deck may be provided. The screen deck 24.1 screens out a fine material fraction 24.2. It falls onto another conveyor belt 25. The further conveyor belt 25 conveys the fine material fraction 24.2 to a crushed material pile 14.4.

The material not screened out by the screening unit 24.1 passes onto a return belt 26. By means of the return belt 26, this rock fraction is returned and again passed through the crusher unit 20.

As schematically illustrated in FIG. 4, the impact crusher includes a control system including a controller 100. The controller 100 may be part of the machine control system of the impact crusher, or it may be a separate control module. The controller 100 may be mounted in the operator's cab of the impact crusher. The controller 100 is configured to receive as input signals an extension signal from extension sensor 102, a contact signal or force signal from force sensor 108, an angular position signal for impact rocker 41 from angular position sensor 110, an angular position sensor for the impact rotor 30 from angular position sensor 111, and a sound signal from microphone 112. The signals transmitted from the various sensors to the controller 100 are schematically indicated in FIG. 4 by phantom lines connecting the sensors to the controller with an arrowhead indicating the flow of the signal from the sensor to the controller 100.

Similarly, the controller 100 will generate control signals for controlling the operation of the various actuators, which control signals are indicated schematically in FIG. 4 by phantom lines connecting the controller 100 to the various actuators, such as hydraulic cylinder actuator 50 with the arrow indicating the flow of the command signal from the controller 100 to the respective actuator. It will be understood that the various actuators as disclosed herein may be hydraulic motors or may be hydraulic piston-cylinder units and that the electronic control signals from the controller 100 will actually be received by electro-hydraulic control valves associated with the actuators and the electro-hydraulic control valves will control the flow of hydraulic fluid to and from the respective hydraulic actuators to control the actuation thereof in response to the control signal from the controller 100. The control signals are generated at least in part in response to one or more of the input signals.

Alternatively, the actuators may be electric actuators such as the electric motor 106. In such an embodiment the control signals from the controller 100 may activate relays and switches to direct electrical power to the electric motors to drive the motors in a desired direction at a desired speed.

Controller 100 includes or may be associated with a processor 114, a computer readable medium 116, a data base 118 and an input/output module or control panel 120 having a display 122. An input/output device 124, such as a keyboard, joystick or other user interface, is provided so that the human operator may input instructions to the controller. It is understood that the controller 100 described herein may be a single controller having all of the described functionality, or it may include multiple controllers wherein the described functionality is distributed among the multiple controllers.

Various operations, steps or algorithms as described in connection with the controller 100 can be embodied directly in hardware, in a computer program product 126 such as a software module executed by the processor 114, or in a combination of the two. The computer program product 126 can reside in RAM memory, flash memory, ROM memory, EPROM memory, EEPROM memory, registers, hard disk, a removable disk, or any other form of computer-readable medium 116 known in the art. An exemplary computer-readable medium 116 can be coupled to the processor 114 such that the processor can read information from, and write information to, the memory/storage medium. In the alternative, the medium can be integral to the processor. The processor and the medium can reside in an application specific integrated circuit (ASIC). The ASIC can reside in a user terminal. In the alternative, the processor and the medium can reside as discrete components in a user terminal.

The term "processor" as used herein may refer to at least general-purpose or specific-purpose processing devices and/or logic as may be understood by one of skill in the art, including but not limited to a microprocessor, a microcontroller, a state machine, and the like. A processor can also be implemented as a combination of computing devices, e.g., a combination of a DSP and a microprocessor, a plurality of microprocessors, one or more microprocessors in conjunction with a DSP core, or any other such configuration.

The invention claimed is:

1. A method of determining wear of a rotary impact crusher, the rotary impact crusher including:

an impact rotor and at least two impact bars connected to the impact rotor, the impact bars each having a radially outer end, wherein the radially outer end of at least one of the impact bars forms an impact circle during rotation of the impact rotor;

at least one impact rocker operably associated with the impact rotor such that in an operating position a crushing gap is formed between the impact circle and a crushing section of the at least one impact rocker; and an actuator configured to adjust a position of the at least one impact rocker relative to the impact rotor;

wherein the method comprises steps of:

(a) adjusting the position of the at least one impact rocker relative to the impact rotor with the actuator by a first adjustment value until the crushing section of the at least one impact rocker contacts the at least one of the impact bars or the impact circle;

(b) comparing the first adjustment value to a first reference value to make a first comparison corresponding to total wear of the at least one impact rocker and the at least one of the impact bars;

(c) adjusting the position of the at least one impact rocker relative to the impact rotor by a second adjustment value until the at least one impact rocker contacts a reference measurement section defined on the impact rotor; and (d) comparing the second adjustment value to a second reference value to make a comparison corresponding to wear of the at least one impact rocker.

2. The method of claim 1, wherein step (c) further comprises:

rotating the impact rotor to a position wherein the reference measurement section of the impact rotor faces the crushing section of the at least one impact rocker;

then stopping or slowing rotational motion of the impact rotor; and then adjusting the position of the at least one impact rocker until the crushing section of the at least one impact rocker rests against the reference measurement section.

3. The method of claim 1, wherein step (c) further comprises:

detecting contact of the crushing section of the at least one impact rocker with the reference measurement section with a sensor; and stopping movement of the at least one impact rocker relative to the impact rotor with a controller in response to a contact signal from the sensor.

4. The method of claim 3, wherein step (c) further comprises:

when the at least one impact rocker is in contact with the reference measurement section, measuring the second adjustment value as an angular position of the at least one impact rocker.

5. The method of claim 3, wherein step (c) further comprises:

when the at least one impact rocker is in contact with the reference measurement section, measuring the second adjustment value as a displacement of the actuator.

6. The method of claim 1, wherein step (c) further comprises:

rotating the impact rotor with a rotary actuator to a predetermined angular position wherein the reference measurement section of the impact rotor faces the crushing section of the at least one impact rocker, and stopping the impact rotor at the predetermined angular position.

7. The method of claim 6, the rotary impact crusher including a main drive for rotating the impact rotor during a crushing operation, wherein:

the step of rotating the impact rotor with a rotary actuator is further characterized in that the rotary actuator comprises an auxiliary drive in addition to the main drive.

8. The method of claim 7, wherein:

the step of rotating the impact rotor with a rotary actuator is further characterized in that the auxiliary drive is manually operated.

9. The method of claim 7, wherein:

the step of rotating the impact rotor with a rotary actuator is further characterized in that the auxiliary drive is motorized and the impact rotor is rotated with a motor.

10. The method of claim 1, wherein step (c) is further characterized in that the reference measurement section is defined by one or more surface areas of the impact rotor.

11. The method of claim 10, wherein step (c) further comprises:

detecting an angular position of the impact rotor about an axis of rotation of the impact rotor with an angular position sensor;

transmitting an angular position signal from the angular position sensor to a controller; and adjusting the angular position of the impact rotor in response to a control signal from the controller until one of the one or more surface areas of the impact rotor faces the crushing section of the at least one impact rocker.

12. The method of claim 10, wherein step (c) is further characterized in that the one or more surface areas of the impact rotor in side view perpendicular to an axis of rotation of the impact rotor have a shape of a circular segment rotating about the axis of rotation of the impact rotor.

13. The method of claim 10, wherein step (c) is further characterized in that the one or more surface areas of the impact rotor in side view perpendicular to an axis of rotation of the impact rotor form a cross-sectional shape of a spiral arc segment, and a radial distance of points on the spiral arc segment from the axis of rotation is stored in a memory of a controller.

14. The method of claim 1, further comprising:
repeating steps (a) through (d); and
determining with a controller an expected remaining service life of the impact bars and/or the at least one impact rocker.

15. The method of claim 14, further comprising:
providing the controller with information relating to a material property of material to be crushed; and
wherein the determining with the controller of the expected remaining service life of the impact bars and/or the at least one impact rocker is based at least in part upon the information relating to the material property.

16. The method of claim 1, further comprising:
determining wear of the at least one of the impact bars by subtracting the wear of the at least one impact rocker from the total wear.

17. The method of claim 1, wherein:
the first reference value is equal to a predetermined crushing gap dimension.

18. The method of claim 1, wherein:
steps (b) and (d) are performed by a controller.

* * * * *